July 10, 1945.  W. S. PRAEG  2,380,261
METHOD OF SHAVING GEARS
Filed Jan. 10, 1944  4 Sheets-Sheet 1
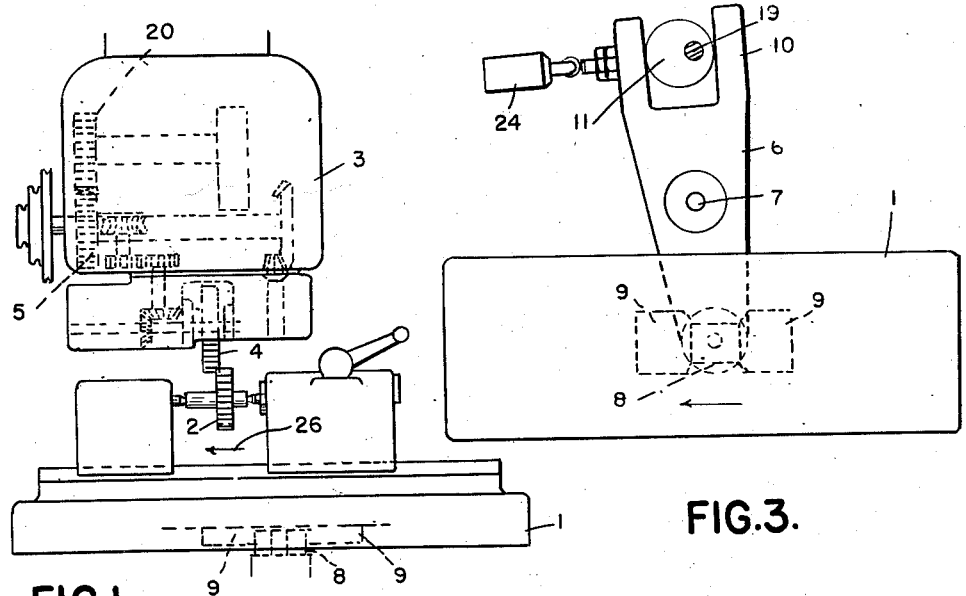
FIG.1.
FIG.3.
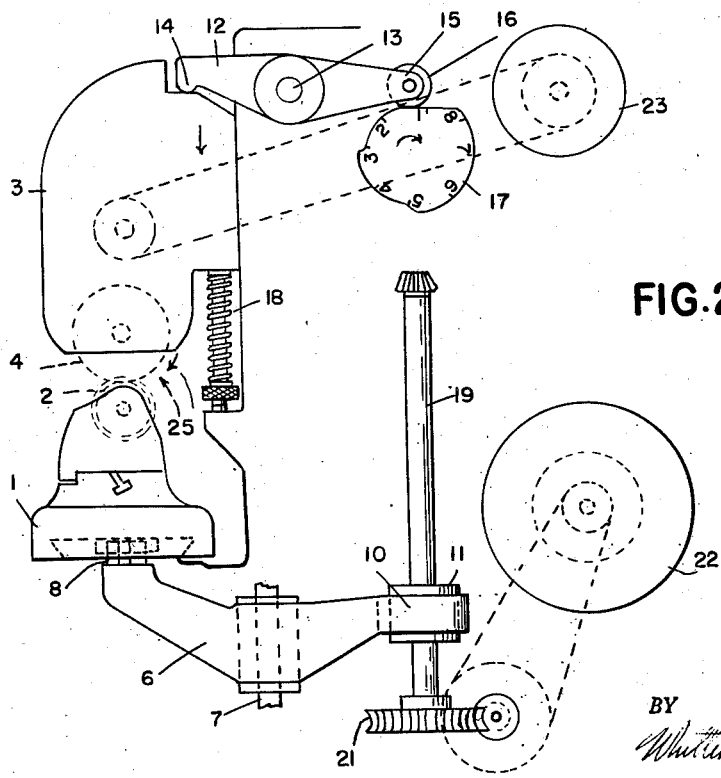
FIG.2.
INVENTOR.
WALTER S. PRAEG
BY
ATTORNEYS July 10, 1945. W. S. PRAEG 2,380,261
METHOD OF SHAVING GEARS
Filed Jan. 10, 1944 4 Sheets-Sheet 2

*INVENTOR.*
WALTER S. PRAEG
BY
*Whittemore Hulbert & Belknap,*
ATTORNEYS

July 10, 1945.  W. S. PRAEG  2,380,261
METHOD OF SHAVING GEARS
Filed Jan. 10, 1944  4 Sheets-Sheet 3

INVENTOR.
WALTER S. PRAEG
BY
ATTORNEYS

July 10, 1945.  W. S. PRAEG  2,380,261
METHOD OF SHAVING GEARS
Filed Jan. 10, 1944  4 Sheets-Sheet 4

INVENTOR.
WALTER S. PRAEG
BY
ATTORNEYS

Patented July 10, 1945

2,380,261

UNITED STATES PATENT OFFICE 2,380,261

METHOD OF SHAVING GEARS

Walter S. Praeg, Detroit, Mich., assignor to National Broach & Machine Company, Detroit, Mich., a corporation of Michigan Application January 10, 1944, Serial No. 517,726

2 Claims. (Cl. 90—1.6)

The invention relates to the finishing of gears and refers more particularly to the shaving of gears.

The invention has for one of its objects to provide an improved method of shaving a gear which comprises relatively translating the gear and cutter in opposite directions and relatively feeding the gear and cutter toward each other at one end only of the relative translation to thereby avoid objectionable interference or resistance to the relative feeding.

The invention has for another object to provide an improved method of shaving a gear which comprises reversing the direction of rotation of the motor for driving the cutter at one end only of the relative translation of the gear and cutter to avoid overheating the cutter driving motor when the rate of relative translation is very fast.

The invention has for a further object to provide a method which is particularly useful in shaving a blind gear and a narrow face width gear.

These and other objects of the invention will become apparent from the following description, taken in connection with the accompanying drawings, in which Figure 1 is a diagrammatic front elevation of a gear finishing machine for carrying out the method embodying the invention;

Figure 2 is a diagrammatic end elevation thereof;

Figure 3 is a diagrammatic plan view of a portion thereof;

Figure 4:
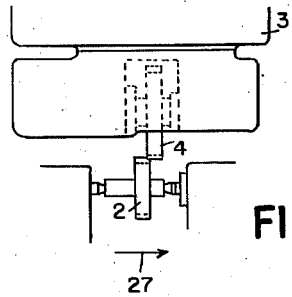
Figures 4, 5, 6, 7, 8, 9 and 10 are diagrammatic views illustrating successive steps of the method.

In carrying out the method embodying the invention a circular gear-like cutter having its teeth provided with cutting edges is rotated in mesh and at crossed axes with a roughed-out gear which has been formed by hobbing or shaping a gear blank. As a result, cutting takes place over a limited contact area so that a minimum pressure is required and, as a result, a minimum distortion takes place. During the rotation a relative lateral movement or translation in opposite directions between the cutter and gear is effected and at one end only of the relative lateral movement or translation the cutter and gear are relatively fed toward each other until the desired amount of material has been removed from the gear. During the relative lateral movement or translation in one direction following the relative feed the cutting action of the cutter is distributed from end to end of the teeth of the gear. During the relative lateral movement or translation in the opposite direction the distance between the axes of the cutter and gear remains fixed so that an idling stroke occurs during which the teeth of the gear may be more highly finished. Also during the rotation and relative lateral movement or translation in opposite directions between the cutter and gear the direction of rotation of the cutter is reversed at one end only of the relative lateral movement or translation. As a result, the rate of relative lateral movement or translation may be very fast without overheating the motor for driving the cutter.

A machine for carrying out the above method, as diagrammatically illustrated in Figures 1, 2 and 3, comprises the table 1 carrying the gear 2 to be shaved and the head 3 above the table carrying the circular gear-like cutter 4 and suitable gearing 5 for rotating the cutter. The cutter has its teeth formed with cutting edges extending generally parallel to the plane of rotation of the cutter. The gear and cutter mesh at crossed axes at a limited angle preferably between 3° and 30° and the rotation of the cutter compels rotation of the gear. The gear and cutter are relatively translated in opposite directions in a plane parallel to the axis of the gear by reciprocating the table 1 by means of the lever 6 which is pivotally mounted between its ends at 7 and has one end 8 located between the abutments 9 upon the table and the other end 10 bifurcated to straddle the eccentric 11. The gear and cutter are relatively fed toward each other by moving the head 3 downwardly toward the table 1 by means of the lever 12 which is pivotally mounted between its ends at 13 and has one end 14 engaging the head and the other end 15 provided with the roller 16 engaging the cam 17. 18 is a coil spring for resiliently holding the head 3 against the end 14 of the lever.

The eccentric 11 and the cam 17 are driven in timed relation to each other and the cam is constructed to effect small increments of feed of the cutter 4 toward the gear 2 at one end only of the relative translations in opposite directions. While the cam may have different numbers of stations, it, as shown in the present instance, has eight stations, 1', 2', 3', 4', 5', 6', 7' and 8', which register with or are opposite to and engage the roller 16 at the ends of successive relative translations. More particularly, the eccentric 11 is mounted on the vertical shaft 19, the upper end of which is connected to the cam 17 by the gearing 20, which latter is carried by the column of the machine. The lower end of the shaft 19 is connected by the gearing 21 to the electric motor 22.

The electric motor 23, which is connected to the gearing 5 to drive the same, is reversible to rotate the cutter in opposite directions. The operation of the motor 23 is automatically controlled in timed relation to the eccentric 11 and the cam 17 to reverse the motor and the cutter at one end only of the relative translations of the gear and cutter in opposite directions. As shown in the present instance, the cutter driving motor is reversed by the limit switch 24 which is operated by the eccentric 11 through the bifurcated end of the lever 6.

Referring to the method of shaving, the successive steps are diagrammatically illustrated in Figures 1 and 2, 3, 4, 5, 6, 7, 8, 9 and 10. At the start, as shown in Figures 1 and 2, the cutter 4 and the gear 2 are in mesh at crossed axes with the cutter mainly at the left hand side of the gear and the cam in a rotative position with its station 1' registering with the roller 16. Also the cutter and the gear are rotating in the directions of the arrows 25 in Figure 2. During the first step, the table 1 is moved in the direction of the arrow 26 in Figure 1 to the position illustrated in Figure 4 with the cutter 4 mainly at the right hand side of the gear 2. During this relative translation, the contact between the teeth of the cutter 4 and gear 2 progresses from the left hand end to the right hand end of the gear to distribute the shaving by the cutter over the teeth of the gear. Also, during the first step the cam 17 is rotated to bring its station 2' in registration with the roller 16, as also shown in Figure 4. Since the cam has the same radius from the station 1' to the station 2' the spacing between the axes of the cutter and gear is maintained. At this time, the first cutting stroke has been completed.

Figure 5:
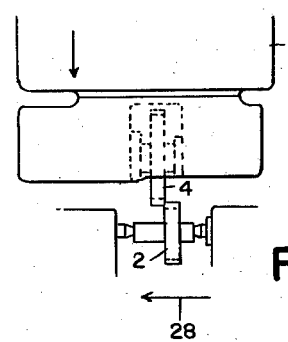

During the second step, the table 1 is moved in the direction of the arrow 27 in Figure 4 and the cam 17 is rotated to bring the parts to the positions shown in Figure 5, at which time the cutter 4 and gear 2 are in the same relative position of translation, as shown in Figure 1, and the cam 17 is in a position with its station 3' registering with the roller 16. During this step the axes of the cutter and gear are maintained in fixed relation until the station 3' registers with the roller 16 at the end of the stroke, the cam at this time feeding the cutter 4 a small increment toward the gear 2. The first idling stroke has now take place. Also, at the end of the first idling stroke the cutter driving motor 23 is reversed by operation of the switch 24.

Figure 6:
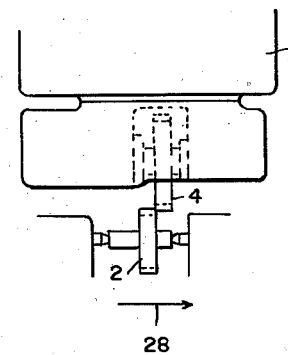

The cutter having been moved a small increment toward the gear and the rotation of the cutter and gear having been reversed, the cutter effects a shaving of the teeth of the gear during the third step while the table 1 is being moved in the direction of the arrow 28 in Figure 5 to bring the parts to the positions shown in Figure 6. At this time it will be noted that the station 4' of the cam 17 registers with the roller 16 and also that the portion of the cam including the station 4' forms part of a dwell so that during the second cutting stroke the spacing between the axes of the cutter and gear has been maintained.

Figure 7:
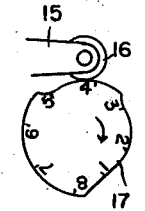
Figure 7:
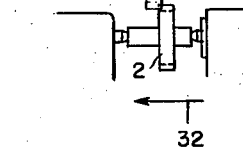
Figure 7:
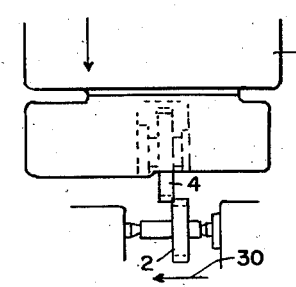

This next relative translation is the fourth step during which the table is moved in the direction of the arrow 29 in Figure 6 and the cam 17 is rotated to bring the parts to the positions shown in Figure 7. At this time the cutter and gear occupy the same relative position of translation, shown in Figure 1, and the cam occupies a position with its station 5' registering with the roller 16. During this step the axes of the cutter and gear are maintained in fixed relation until the station 5' registers with the roller 6 so that the second idling stroke occurs. Upon registration of the station 5' with the roller the cutter is fed by a small increment toward the gear and the cutter driving motor is reversed.

During the fifth step relative translation of the cutter and gear is effected by moving the table 1 in the direction of the arrow 30 in Figure 7 to effect a third shaving of the teeth of the gear by the cutter. At the end of this step the parts are in the positions shown in Figure 8 with the cutter and gear in the same relative positions of translation as shown in Figures 4 and 6 and the cam in the position with its station 6' registering with the roller 16, the spacing between the axes of the cutter and gear having been maintained fixed.

Figure 8:
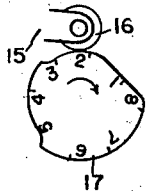
Figure 8:
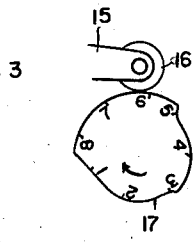
Figure 9:
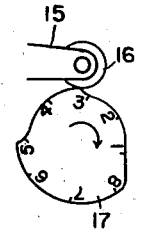
Figure 9:
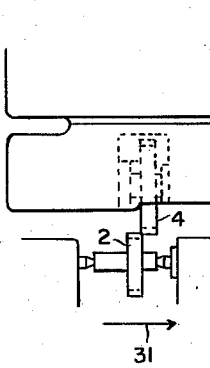
Figure 9:
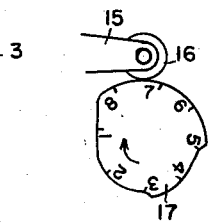
Figure 10:
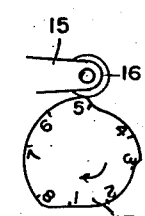
Figure 10:
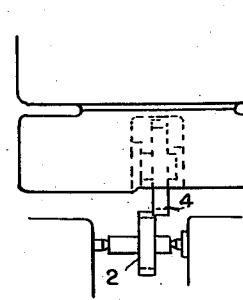

During the relative translations by moving the table in the direction of the arrows 31, 32 and 33 in Figures 8, 9 and 10, respectively, the spacing between the axes of the cutter and gear is maintained fixed since the portion of the cam between the stations 5' and 8' forms a dwell. As a result, the movement of the parts to the positions of translation indicated in Figures 9, 10 and 1 are mainly idling strokes during which the surfaces of the teeth of the gear are more accurately and highly finished. It is apparent that the number of cycles, including the cutting in one direction of relative translation, and the number of cycles, including mainly idling in both directions of relative translation, may be varied.

Figure 11:
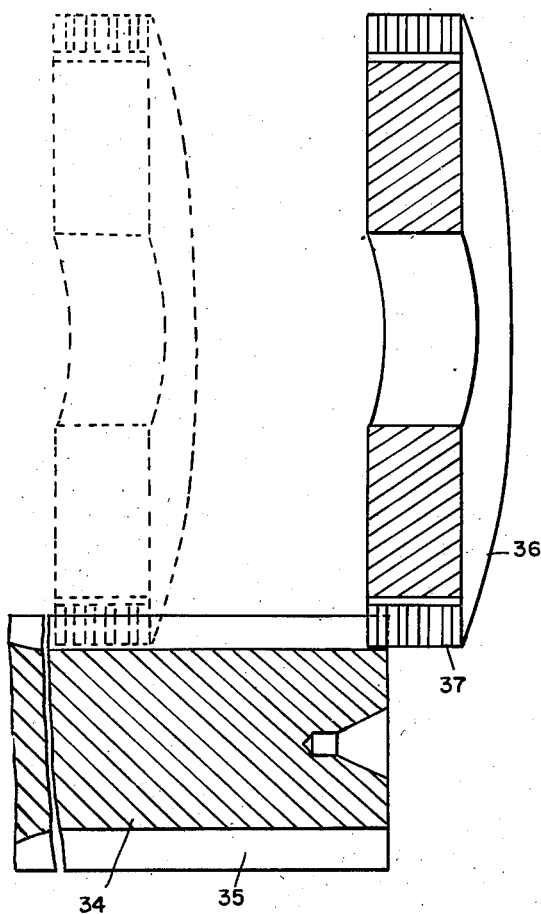
Figure 11 is a diagrammatic cross section illustrating one special use of the method.
Figure 12:
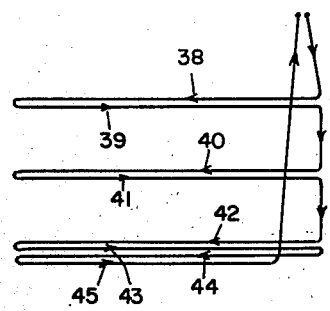
Figure 12 is a diagrammatic view illustrating the method used in Figure 11.

Figures 11 and 12 illustrate diagrammatically a special gear and also the method of shaving the gear. The gear is a blind hobbed pinion 34 having the teeth 35 which are open at one end and blind at the other end. 36 is the cutter having its teeth formed with the cutting edges 37 extending generally parallel to the plane of rotation of the cutter. The cutter and pinion are in mesh at crossed axes and rotated and during the rotation they are relatively translated to relatively move the cutter and gear so that the cutter successively occupies the positions shown by the full lines and the dotted lines relative to the gear, as illustrated in Figure 11. At the start, the cutter occupies the position shown in full lines in Figure 11, at which time it is mainly to the right of the gear and at the open end of the teeth of the latter. The relative positions of the axes of the cutter and gear are such that during the first relative translation, as indicated by the arrow 38 in Figure 12, the cutter effects a shaving of the teeth of the gear until it reaches the relative position indicated by dotted lines in Figure 11, at which time relative translation in the direction of the arrow 39 in Figure 12 takes place, during which the spacing between the axes of the cutter and gear is maintained. When the cutter again reaches the position indicated by the full lines in Figure 11, relative feed of the cutter and gear is effected and the direction of rotation is reversed so that upon the next relative translation in the direction of the arrow 40 in Figure 12 the teeth of the gear are cut. During the relative translation in the opposite direction, as indicated by the arrow 41 in Figure 12, the spacing between the axes of the cutter and gear is maintained and when the cutter again reaches the position indicated by the full lines in Figure 11 relative feed of the cutter and gear takes place and the direction of rotation is reversed so that upon relative translation in the direction of the arrow 42 in Figure 12 the teeth of the gear are cut. Then during the relative translations in the directions of the arrows 43, 44 and 45 in Figure 12 the spacing between the axes of the cutter and gear is maintained so that the relative translations are idling strokes used to finish the surfaces of the gear teeth, the last two strokes being carried out with the cutter and gear rotating in a direction opposite to that of the preceding stroke. After the last relative translation the gear may be returned to its original position.

Figure 13:
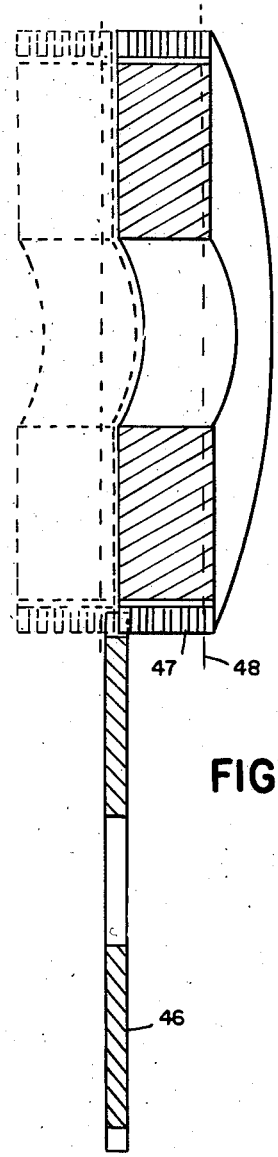
Figure 13 is a view similar to Figure 11 illustrating another special use of the method.

Figure 13 shows another special construction of gear for the shaving of which the method embodying the invention is particularly useful. In this instance the gear is a narrow face width gear 46, the teeth of which are to be shaved by the cutter 47 having its teeth provided with cutting edges substantially parallel to the plane of rotation of the cutter. The gear and cutter are arranged in mesh and at crossed axes with the center line 48 of crossed axes near one end of the cutter. While the cutter and gear are being rotated, they are also relatively translated to relatively move the same so that the cutter moves from the position indicated by full lines to the position indicated by dotted lines relative to the gear so that the center of crossed axes traverses the faces of the teeth of the gear from end to end. During the relative translation in opposite directions the cutter and gear are relatively fed toward each other and their direction of rotation is reversed at one end only of the relative translations, this end being that in which the cutter occupies the full line position and the center of crossed axes is remote from the gear. By reason of relatively feeding the cutter and gear at this end of the relative translations objectionable interference to the relative feeding is largely avoided since the cutter and gear are in comparatively loose mesh at this time.

Figure 14:
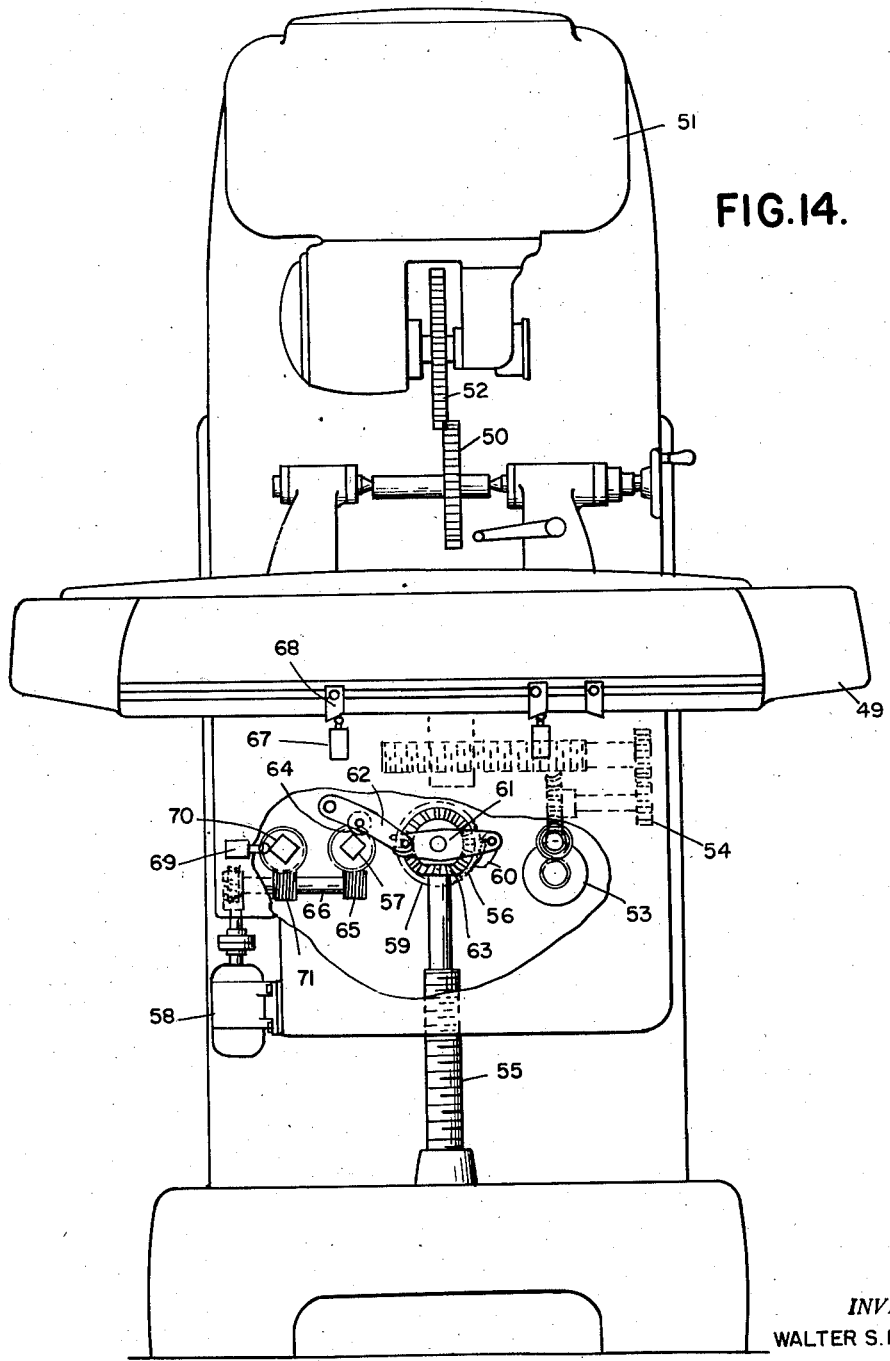
Figure 14 is a diagrammatic front elevation of another machine for carrying out the method.

Figure 14 diagrammatically illustrates another machine for carrying out the method. The machine is quite similar to that shown in the Drummond Patent No. 2,270,421 and has the table 49 which carries the gear 50 and the head 51 which carries the circular gear-like cutter 52 in mesh and at crossed axes with the gear. The cutter is rotated and thereby rotates the gear. The gear and cutter are relatively translated preferably very fast by reciprocating the table 49 through the electric motor 53 and the gearing 54. The mechanism for driving the cutter 52 and reciprocating the table 49 are preferably of standard construction. The electric motor for driving the cutter is reversed at one end only of the relative translations by a limit switch similar to the limit switch 24 and operated by suitable means, such as a dog, upon the table 49.

To effect relative feed of the gear and cutter toward each other, the table 49 is adjusted vertically at one end only of the relative translations, this end being preferably the same as the end at which the cutter driving motor is reversed. The vertical adjustment is accomplished by the table elevating screw 55 which is driven by the ratchet feed mechanism 56 operated by the cam 57, which latter is driven by the electric motor 58. The ratchet feed mechanism 56 comprises the ratchet plate 59, the pawl 60 engageable with the teeth of the ratchet plate, the arm 61 and the lever 62. The arm is pivoted coaxially with the ratchet plate and has pivotally connected to one end the pawl 60 and is pivotally connected at the other end to the lever. The ratchet plate is connected to the feed screw by the bevel pinion 63 secured to the feed screw and a suitable bevel gear meshing with the pinion and to which the plate is secured. The lever 62 carries intermediate its ends the roller 64 which is engageable with the cam 57. The cam 57 is driven by the worm 65 upon the shaft 66, which latter in turn is driven by the electric motor 58. For controlling the operation of the electric motor, there is the limit switch 67 for starting the motor 58, this limit switch being actuable by the contact dog 68 upon the table when the table is at one end of its travel. There is also the limit switch 69 for stopping the electric motor 58, this latter limit switch being actuable by the cam 70 which is driven in perfect synchronism with the cam 57 by the worm 71 upon the shaft 66.

In operation it will be seen that when the table is at one end of its relative translation the contact dog operates upon the limit switch 67 to cause the electric motor 58 to be started. As a result, the worms 59 and 71 are rotated in unison to rotate the cams 57 and 70 in unison. As a result of the rotation of the cam 57 the lever 62 is rocked, as is also the arm 61, to advance the ratchet plate 59 and thereby turn the feed screw 55 to raise the table and, consequently, the gear. The rotation of the cam 70 continues to the next high point on the cam, at which time the limit switch 69 is operated to cause the electric motor to stop by deenergizing the same.

What I claim as my invention is:

1. The method of shaving the teeth of a blind gear member which comprises rotating the blind gear member and a circular gear-like cutter member in mesh and at crossed axes, meanwhile effecting a relative translation of the members in opposite directions so that a relative reciprocation of the members is effected between a position in which the cutter member extends partly beyond the open end of the gear member and a position in which the cutter member is located adjacent the blind end of the gear member, and relatively feeding the members toward each other at the first mentioned position only.

2. The method of shaving the teeth of a blind gear member which comprises rotating the blind gear member and a circular gear-like cutter member in mesh and at crossed axes, meanwhile effecting a relative translation of the members in opposite directions so that a relative reciprocation of the members is effected between a position in which the cutter member extends partly beyond the open end of the gear member and a position in which the cutter member is located adjacent the blind end of the gear member, relatively feeding the members toward each other at the first mentioned position only, and reversing the direction of rotation of the members at the first mentioned position only.

WALTER S. PRAEG.